United States Patent
Cannon et al.

(10) Patent No.: US 6,639,972 B1
(45) Date of Patent: Oct. 28, 2003

(54) METHOD FOR SCREENING ACTIVE VOICE MAIL MESSAGES

(75) Inventors: Joseph M. Cannon, Harleysville, PA (US); Donald Alfred Fleck, Emmaus, PA (US); James A. Johnason, Macungie, PA (US); Philip David Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/300,025

(22) Filed: Apr. 27, 1999

(51) Int. Cl.[7] .............................................. H04M 11/00
(52) U.S. Cl. ........................ 379/88.18; 379/88.26; 379/88.12; 379/84; 379/85
(58) Field of Search ................. 379/67.1, 68, 88.12, 379/88.13, 88.22, 88.25, 88.18, 142.06, 207.15

(56) References Cited

U.S. PATENT DOCUMENTS

| | | | | |
|---|---|---|---|---|
| 5,384,831 A | * | 1/1995 | Creswell et al. | 379/114.05 |
| 5,471,519 A | * | 11/1995 | Howe et al. | 379/88.26 |
| 5,651,054 A | * | 7/1997 | Dunn et al. | 379/88.11 |
| 5,835,573 A | * | 11/1998 | Dee et al. | 379/88.26 |
| 5,960,064 A | * | 9/1999 | Foladare et al. | 379/88.26 |
| 6,014,427 A | * | 1/2000 | Hanson et al. | 379/67.1 |
| 6,031,896 A | * | 2/2000 | Gardell et al. | 379/88.17 |
| 6,226,358 B1 | * | 5/2001 | Schwartz et al. | 379/67.1 |
| 6,310,939 B1 | * | 10/2001 | Varney | 379/88.01 |
| 6,337,898 B1 | * | 1/2002 | Gordon | 379/67.1 |
| 6,493,432 B1 | * | 12/2002 | Blum et al. | 379/88.12 |

* cited by examiner

*Primary Examiner*—Fan Tsang
*Assistant Examiner*—Simon P. Sing

(57) ABSTRACT

A method for screening of an active voice mail message enables real time monitoring by a subscriber to the voice mail system of incoming calls. Once the identity of the subscriber is established, the subscriber is presented with the option of screening an incoming message. A subscriber desiring to screen the message responds by activating a predetermined key or sequence of keys to enter a listen-only mode for monitoring of the incoming message. The subscriber may then interrupt the message and take the call, continue listening to the incoming message, or terminate listen-only mode and simply permit the message to be stored for later retrieval.

14 Claims, 2 Drawing Sheets

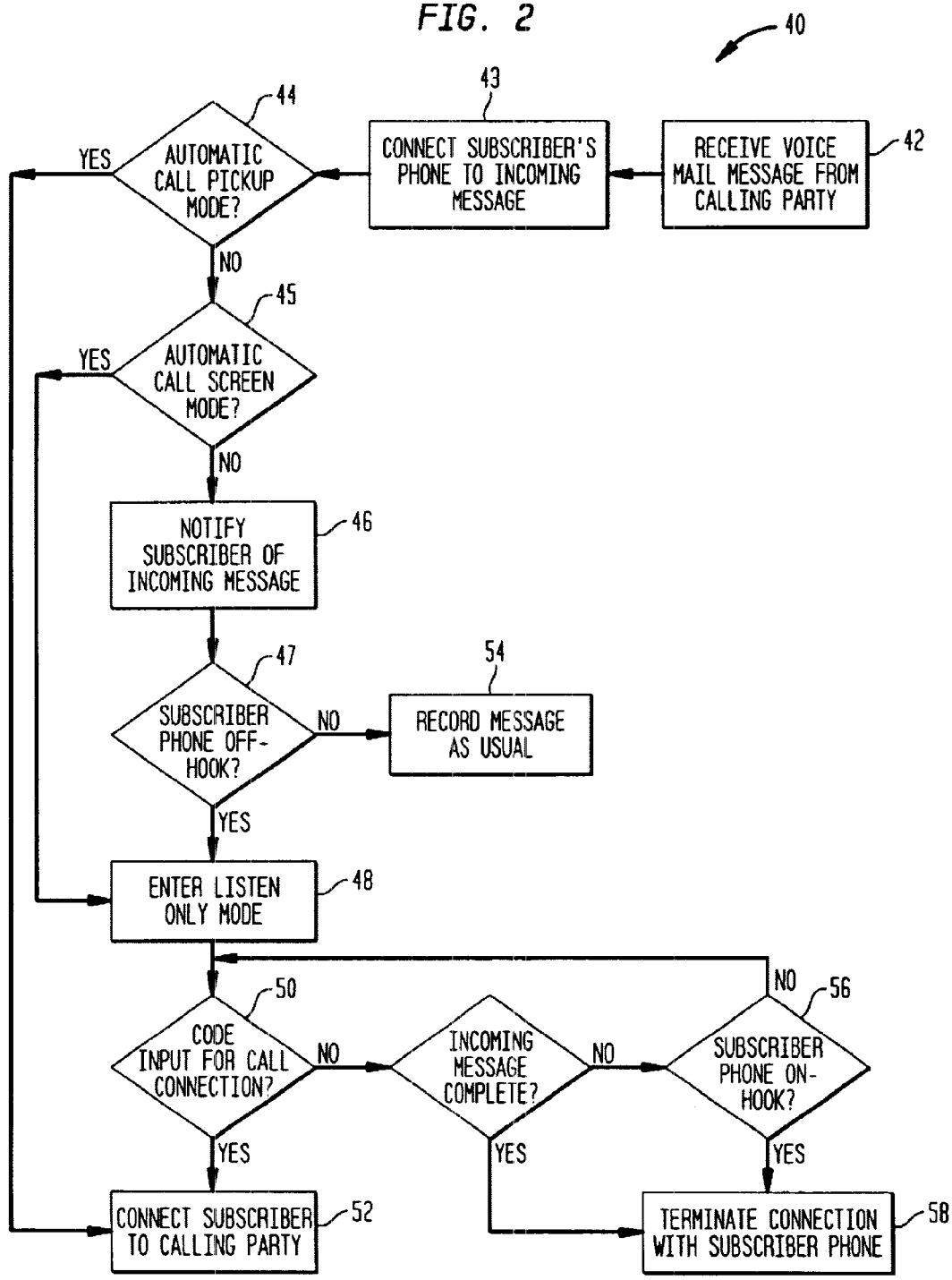

METHOD FOR SCREENING ACTIVE VOICE MAIL MESSAGES

BACKGROUND OF THE INVENTION

1. Field of the Invention

The present invention relates to call screening, and more particularly to call screening of an active voice mail message in a voice mail system.

2. Description of the Related Art

With the inception of the telephone answering device (TAD), the population has been provided with the ability to record a message from an incoming caller, and subsequently return the call at the called party's convenience. When using a TAD, the incoming message being recorded is generally also concurrently broadcast through a speaker on the device itself. If the called party is present in the area of the TAD when the incoming call is received, he or she can listen to the message being left in real time, and decide whether they want to take the call (i.e. screen the call). If the called party wants to speak to the calling party at any point during screening, she may simply pick up the telephone receiver, and interrupt the message being left by the calling party. Generally, TADs will sense the drop in the DC line voltage of the telephone line resulting from the off-hook state of the telephone receiver, and discontinue the recording of the message. A TAD, however, cannot receive and record a message for the called party while the telephone line it is connected to is in use. Thus, a calling party will receive a busy signal and is required to wait and call back when the line becomes available.

The next generation of the TAD is the voice mail system. The voice mail system can be implemented in many ways, such as for example through a private branch exchange (PBX) or through a central switching office (e.g. telephone service provider). One advantage of the voice mail system over the standard TAD is that when the line being called is busy, the system enables the calling party to leave a message for the called party, who may then listen to the message and return the call. A shortcoming of the voice mail system is that the called party cannot listen to a voice mail message as it is being recorded (i.e. screen an active voice mail message). In this case, the called party is forced to wait until the calling party completes the recording of the message, then listen to the recorded message, and then return the telephone call.

SUMMARY OF THE INVENTION

It is therefore an object of the present invention to provide a method for screening an active voice mail message and enable the called party to voluntarily interrupt the same.

This and other objects of the invention are achieved by providing a method for screening active voice mail messages comprising the steps of accessing the voice mail system for message pickup; identifying the subscriber accessing the voice mail system; determining whether there is an active incoming message for an identified subscriber; and providing the subscriber with the ability to listen in on the incoming active message without interrupting the same.

In accordance with the invention, when the subscriber has entered a listen only mode, she can connect to the caller (i.e. interrupt the active message) by activating a DTMF key or sequence of keys. The subscriber may also terminate the listen only mode without interrupting the active message.

If there is no active message being left when the subscriber accesses the voice mail system using the normal phone number or a special call screening access phone number, the subscriber is so notified, and is presented with the option of entering the voice mail main menu system or terminating the call. In another embodiment, when there is an active message being recorded, the subscriber has the option of screening it or entering the voice mail main menu system. If the subscriber chooses to screen the call, she activates a DTMF key or sequence of keys and is then connected to the active message in listen only mode.

In an alternative embodiment, the subscriber can access the voice mail system and automatically be connected to an active voice mail message, and then either screen the active incoming message or automatically interrupt the same and pickup the call. The automatic connection mode can be entered by dialing a special call screening phone number, or through a subscriber-selectable set option within the voice mail system. The subscriber can enable options such as automatic call pickup and automatic call screening. In the automatic call pickup mode, when an active incoming message is detected by the voice mail system, the subscriber's telephone set is automatically connected to the calling party who is concurrently leaving the active incoming message, or optimally while the subscriber's outgoing message is being played. In the automatic call screening mode, the subscriber's telephone set automatically enters the listen only mode (i.e. screening/monitoring mode) where there is an active incoming voice mail message being left at the time that the subscriber accesses the voice mail system.

In another embodiment of the present invention, the voice mail subscriber (i.e. the called party) is not required to access the voice mail system in order to screen an incoming active message. Upon receiving an active voice mail message, the voice mail system automatically connects the active message to the subscriber's telephone set. A determination is then made as to whether the subscriber has activated various user selectable options such as, for example, automatic call pickup and automatic call screening. When the subscriber has activated the automatic call pickup option, the subscriber's telephone set is automatically connected to the calling party upon receipt of the active incoming message. When the subscriber activates the automatic call screening mode, the subscriber's telephone set automatically enters a listen only mode for screening the incoming active voice mail message.

When the subscriber is connected in listen only mode and does not want to connect to the calling party leaving the active message, the system determines whether the subscriber's telephone is in the off-hook or on-hook state. When the system detects the on-hook state of the subscriber telephone after entering the listen only mode, the connection with the calling party is terminated, and the active voice mail message is recorded as usual.

When the subscriber does not activate one of the user selectable options, a determination is then made as to whether the subscriber's telephone is in an off-hook state. If the subscriber's telephone is placed in an off-hook state during the receipt of the active message, the system automatically enables the subscriber to hear the active message in the listen only mode without requiring any additional input or action by the subscriber. The subscriber can then connect to the calling party and interrupt the active message by pressing a dedicated or predetermined DTMF key or sequence of keys. If an off-hook state of the subscriber telephone is not detected, then the message is recorded as usual.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the views:

FIG. 2 is a flow chart of a method for screening voice mail messages in accordance with a second embodiment of the invention.

DETAILED DESCRIPTION OF THE PRESENTLY PREFERRED EMBODIMENTS

Figure 1:
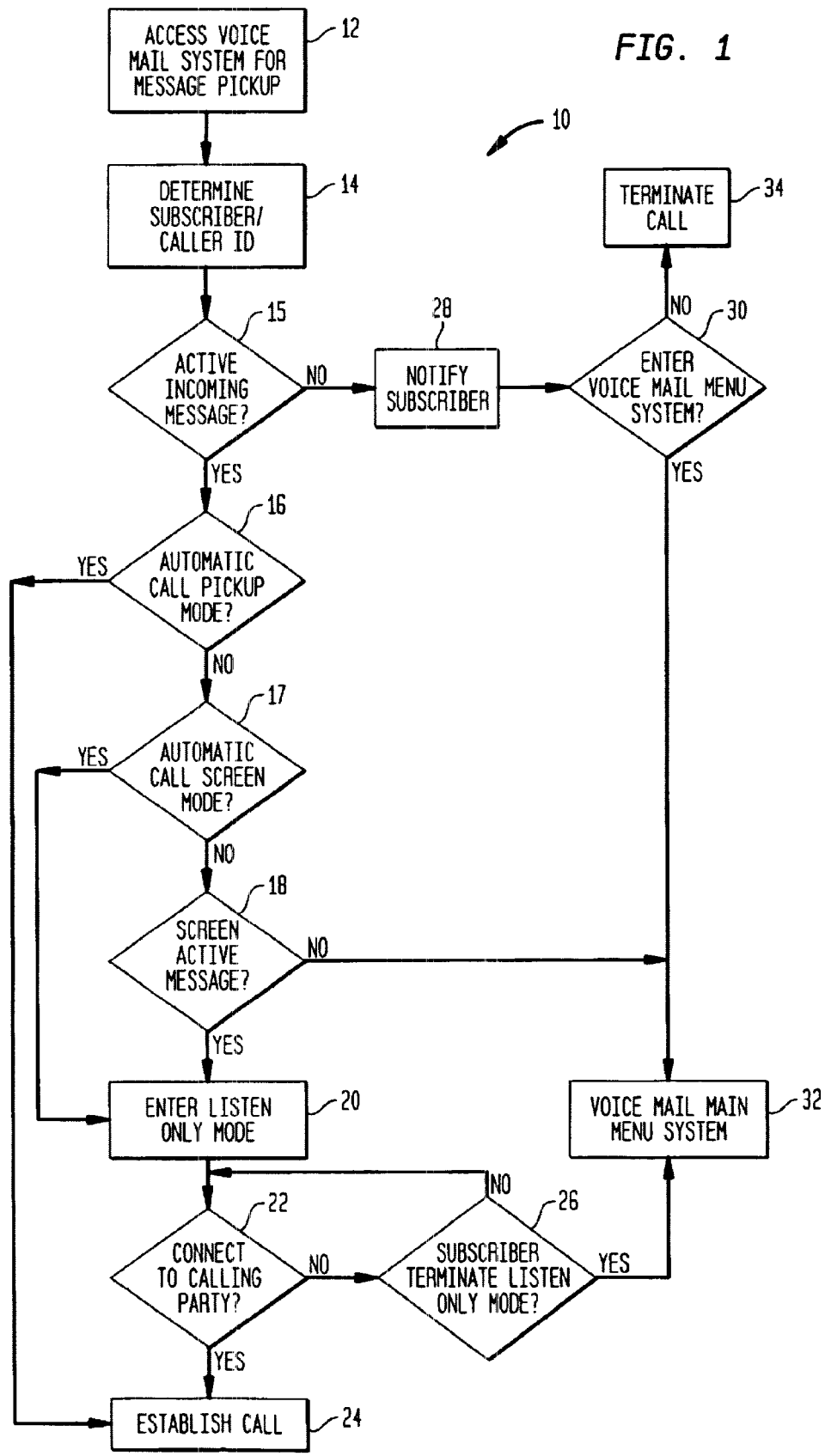
FIG. 1 is a flow chart of a method for screening voice mail messages in accordance with a first embodiment of the invention.

Referring to FIG. 1, a first embodiment of a method 10 for screening voice mail messages in accordance with the invention is shown. Initially, the voice mail system subscriber must access the voice mail system for message pickup (step 12). This accessing of the system can be performed by dialing a dedicated telephone number for the voice mail system, or by activating a dedicated button or sequence of buttons on the subscriber's telephone set or extension. Once the subscriber has accessed the voice mail system the system determines the identity of the subscriber (step 14), for example from caller ID information, from the telephone extension number, or from a subscriber-input account number or ID.

Once the subscriber's identity has been established, the system determines whether there is currently an active message then being left for this subscriber, or whether the subscriber's outgoing message is currently being played for a calling party (step 15). If there is no active message, the subscriber is provided with the option of entering the voice mail main menu system (step 30). Alternatively, the subscriber can be notified (step 28) that there is no active message before providing the option of entering the voice mail main menu system. If the subscriber does not want to access the main menu (step 30), then the call is terminated (step 34); otherwise, the subscriber is forwarded to the voice mail main menu system (step 32).

When there is an active message at step 15 in the form of the outgoing message being played for a calling party, or of an actual incoming message being left by the calling party, the voice mail system determines whether the subscriber has activated any of the user selectable options provided by the voice mail system. For example, the subscriber can activate an automatic call pickup mode (step 16) such that when an incoming message is detected, the subscriber's telephone set is automatically connected to the calling party (step 24) and recording of the voice mail message is discontinued. Another user selectable option can, for example, provide an automatic call screening mode (step 17) whereby the subscriber's telephone is automatically connected to the incoming active voice mail message in a listen only mode (step 20) upon receipt of the message. These user selectable options can be selectively activated and de-activated by the voice mail system subscriber through the voice mail main menu system.

When the subscriber has not activated one of the user selectable options, they are provided with the option to screen (step 18) when an active incoming voice mail message is present. If the subscriber wants to screen the active message, they may activate one or more DTMF keys, the FLASH hook key, or a dedicated key on their telephone set to enter a listen only mode (step 20) in which the subscriber can monitor the incoming message without notification to the caller. Once in the listen only mode, (resulting from steps 17 or 18) the subscriber can then decide whether to interrupt the active message, continue screening or terminate the listen only mode (i.e. discontinue screening of the active message) (step 22). When the subscriber wishes to interrupt the active message and connect to the calling party, she may do so by also pressing a predetermined one or more DTMF keys, or a dedicated key on the telephone set (step 22), whereby the connection is completed and the call is established (step 24).

During the screening of an active message (i.e. during listen only mode), the subscriber can at any point terminate listen only mode (step 26) by again pressing a predetermined one or more DTMF keys or a dedicated key on the telephone set. Once listen only mode is terminated without connecting to the calling party, the subscriber is forwarded to the voice mail main menu system (step 32).

FIG. 2 depicts another embodiment of a method for screening voice mail messages according to the present invention. In this alternative method, generally identified by reference numeral 40, the system initially receives a voice mail message from a calling party (step 42). Upon receipt and recording of the incoming voice mail message, the system automatically connects the subscriber's telephone (i.e. the telephone set of the called party) to the in-process incoming message (step 43). This automatic connection is made when the system determines that the subscriber's telephone is in an on-hook state (i.e., when the subscriber's telephone set is not in use). The voice mail system then makes a determination as to whether any of certain user selectable options have been activated by this particular voice mail system subscriber. The user-selectable options may include, for example, the automatic call pickup of an active voice mail message (step 44), or the automatic entry into call screening mode (i.e. listen only mode) at step 45.

When the subscriber has activated the automatic call pickup mode (step 44), the subscriber's telephone set is automatically connected to the calling party who is leaving the incoming voice mail message, thereby establishing the communication connection (step 52) without recording of any calling party message. When the caller has not activated automatic call pickup mode, the voice mail system determines whether the automatic call screening mode has been activated (step 45). When activated, the automatic call screening mode automatically places the subscriber's telephone set into call screening or listen only mode (step 48) and routes the active incoming message to the subscriber's telephone set while continuing to record the message.

Upon receipt of the incoming voice mail message, the subscriber is notified as to the presence of the incoming voice mail message (step 46). This notification may, for example, take the form of the generation of one or more tones at the subscriber phone, a distinctive ring, or a flashing light.

Once so notified, the system determines the state of the subscriber's telephone receiver (step 47)—that is, whether the subscriber's telephone receiver is in the on-hook or the off-hook state. The on-hook and off-hook states are determined using the line voltage and/or impedance of the subscriber's telephone line. For example, in the on-hook state, a standard wired telephone line has a nominal DC line level of 48 volts. In the off-hook state, the same DC line level drops to less than 10 volts. If the subscriber's telephone receiver is off-hook and the subscriber's telephone line is not in use for another call, then listen only mode is entered (step 48). The system remains in listen only mode until the subscriber inputs a predetermined code to interrupt the active message (step 50) and connect to the call (step 52). If no code is received, the system detects whether the subscriber's phone has been placed on-hook (step 56). An on-hook state of the subscriber's telephone set indicates that the subscriber does not want to connect to the caller leaving the active message, and no longer wishes to screen the active message. The connection of the calling party leaving the message with the subscriber's phone is then terminated (step 58), and the recording of the message continues. If the subscriber's telephone remains in the off-hook state (step 56), listen only mode continues until either the caller or subscriber terminates the call, or the subscriber interrupts the active message and connects to the calling party.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for screening an active voice mail message in a voice mail system from a telephone set remotely connected to the voice mail system comprising the steps of:
   determining an identity of a subscriber accessing the voice mail system;
   determining by the voice mail system whether the voice mail system is receiving an incoming message from a calling party for the subscriber; and
   entering, when an active incoming message is determined to be present, a listen only mode in which the accessing subscriber can monitor the active incoming message while the incoming message is active, wherein said step of entering a listen-only mode comprises prompting the subscriber with a subscriber-selectable option to screen the active incoming message, and responding to a subscriber-entered input to enter the listen-only mode.

2. The method set forth in claim 1, further comprising the steps of:
   selectively, in response to a command to the voice mail system from the subscriber monitoring the active incoming message in listen-only mode, interrupting the active incoming message from the calling party; and
   connecting the subscriber to the calling party after interrupting the active incoming message to establish a communication connection between the calling party and the subscriber.

3. The method set forth in claim 1, wherein said step of determining an identity of the subscriber comprises accessing caller ID information from the remote telephone set used by the subscriber for accessing the voice mail system.

4. The method set forth in claim 1, wherein said step of determining an identity of the subscriber comprises receiving an input code entered by the subscriber using DTMF keys on the remote telephone set.

5. The method set forth in claim 2, wherein said step of interrupting further comprises the steps of providing the subscriber with an option to connect to the calling party by interrupting the active incoming message; and detecting a subscriber input denoting a subscriber decision to interrupt the active incoming message.

6. The method set forth in claim 1, wherein said step of entering is automatically performed in response to a previously set user-selectable option requesting automatic entry into listen only mode upon receipt of an active incoming message.

7. The method set forth in claim 1, further comprising the steps of:
   determining whether a user-selectable automatic call pickup mode is set; and
   automatically connecting an active incoming message upon a determination that the automatic call pickup mode is set;
   wherein said step of entering comprises entering, when an active incoming message is determined to be present, said listen only mode if it has been determined that the automatic call pickup mode is not set.

8. A method for screening an active voice mail message in a voice mail system from a telephone set remotely connected to the voice mail system comprising the steps of:
   determining an identity of a subscriber accessing the voice mail system;
   determining by the voice mail system whether the voice mail system is receiving an active incoming message from a calling party for the subscriber; and
   entering, when an active incoming message is determined to be present, a listen only mode in which the accessing subscriber can monitor the active incoming message while the incoming message is active;
   transmitting a notification signal as to the absence of an active incoming message when it is determined that no active incoming message is present in the voice mail system;
   providing an option to enter a voice mail menu when it is determined that no active incoming message is present in the voice mail system; and
   connecting the remote telephone set to the voice mail main menu upon receipt of an input indicating decision to accept the option to enter the voice mail main menu.

9. The method set forth in claim 8, further comprising the steps of:
   selectively, in response to a command to the voice mail system from the subscriber monitoring the active incoming message in listen-only mode, interrupting the active incoming message from the calling party; and
   connecting the subscriber to the calling party after interrupting the active incoming message to establish a communication connection between the calling party and the subscriber.

10. The method set forth in claim 8, wherein said step of determining an identity of the subscriber comprises accessing caller ID information from the remote telephone set used by the subscriber for accessing the voice mail system.

11. The method set forth in claim 8, wherein said step of determining an identity of the subscriber comprises receiving an input code entered by the subscriber using DTMF keys on the remote telephone set.

12. The method set forth in claim 9, wherein said step of interrupting further comprises the steps of providing the subscriber with an option to connect to the calling party by interrupting the active incoming message; and detecting a subscriber input denoting a subscriber decision to interrupt the active incoming message.

13. The method set forth in claim 8, wherein said step of entering is automatically performed in response to a previously set user-selectable option requesting automatic entry into listen only mode upon receipt of an active incoming message.

14. The method set forth in claim 8, further comprising the steps of:
  determining whether a user-selectable automatic call pickup mode is set; and
  automatically connecting an active incoming message to the subscriber upon a determination that the automatic call pickup mode is set;
  wherein said step of entering comprises entering, when an active incoming message is determined to be present, said listen only mode if it has been determined that the automatic call pickup mode is not set.

* * * * *